Feb. 17, 1959  A. WACHTEL  2,874,128

PHOSPHOR

Filed Dec. 24, 1956

INVENTOR.
ANSELM WACHTEL.

BY
ATTORNEY.

A. WACHTEL

PHOSPHOR

Anselm Wachtel, Sayreville, N. J., assignor to Westinghouse Electric Corporation, East Pittsburgh, Pa., a corporation of Pennsylvania Application December 24, 1956, Serial No. 630,352

7 Claims. (Cl. 252—301.6)

This invention relates to electroluminescent zinc-sulfide phosphors and, more particularly, to a method for improving the reproducibility of such phosphors.

There is disclosed in copending application of Willi Lehmann, S. N. 630,354 titled "Phosphor" filed concurrently herewith, and owned by the present assignee, a method for producing a zinc-sulfide phosphor which is activated by copper and coactivated by halogen, wherein the phosphor is prepared by firing in an atmosphere comprising sulphur vapor. This results in greatly enhancing the brightness and efficiency of the phosphor. Phosphor materials are very often difficult to synthesize while always obtaining substantially the same performance. This condition even exists to some extent with phosphors for fluorescent lamps, which phosphors have been produced in large quantities for many years. While the foregoing zinc-sulfide phosphor disclosed by Lehmann is much brighter and more efficient than the electroluminescent phosphors of the prior art, a maximum of brightness and efficiency for this particular phosphor is not always obtained.

It is the general object of this invention to provide a method for synthesizing a normally green-emitting, electroluminescent zinc-sulfide phosphor which has been prepared by firing in an atmosphere comprising sulphur vapor wherein a maximum of brightness and efficiency for the phosphor may always be obtained.

It is a further object to provide permissible and optimum conditions for synthesizing the zinc-sulfide electroluminescent phosphor so that it is always reproducible with respect to brightness and efficiency.

It is another object to provide a supplemental washing treatment for the prepared phosphor, which treatment will further enhance the brightness and efficiency of the phosphor.

It is still another object to provide a supplemental treatment by which the threshold of visible luminescence for the improved phosphor is lowered.

The aforesaid objects of the invention, and other objects which will become apparent as the description proceeds, are achieved by firing the phosphor raw-mix constituents in a container which is enclosed in an inert atmosphere and which firing container is closed to convection of any exterior gases, but not so tightly closed that positive pressures which are generated in the firing container during the firing process cannot escape.

In order that the correct amount of coactivating constituent may be incorporated into the phosphor, the amount of such constituent in the phosphor raw mix is controlled with respect to the size of the phosphor batch being processed and with respect to the frequency at which the phosphor is to be operated. The phosphor activator material in the raw mix is controlled with respect to the amount of coactivator constituent in the raw-mix and with respect to the frequency at which the phosphor is to be operated. The foregoing is expressable by empirically-derived formulae as are given hereinafter. After firing, the phosphor material may be given further treatment, in order to enhance its brightness and efficiency, by washing in a solution which is a solvent for cuprous sulfide, but which is not a solvent for zinc sulfide and if it is desired to lower the threshold of visible luminescence for the phosphor, the phosphor may be heated in air under carefully-controlled conditions.

For a better understanding of the invention, reference should be had to the accompanying drawing, wherein.

Figure 1:
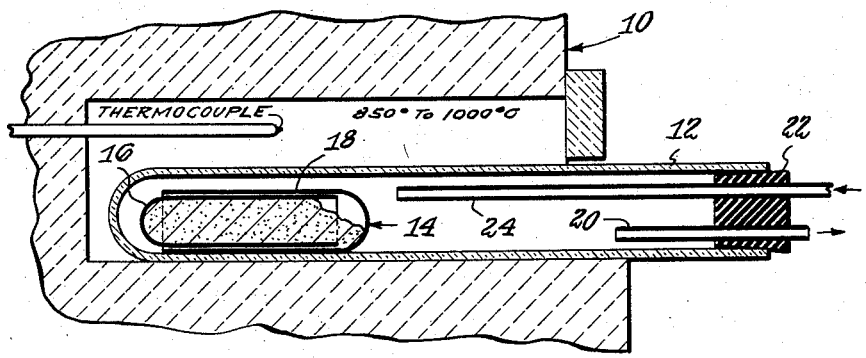
Fig. 1 illustrates a sectional view of a firing furnace for preparing the improved and reproducible phosphor.

The improved phosphor of this invention comprises zinc-sulfide phosphor which is activated by copper and coactivated by chlorine and which phosphor has been fired in an atmosphere comprising sulphur vapor. With respect to the coactivating chlorine, the latest theories and experiments indicate that the coactivator is required to balance the valency of the activator which is introduced into the phosphor. In the instant case, the specified "coactivating chlorine" has a "minus one" valency and is introduced so that a "plus one" activator cuprous ion and a "plus two" zinc ion will have the exact opposite charge as a "minus one" coactivator chlorine ion and a "minus two" sulphur ion. Thus the charges in the phosphor matrix are compensated or balanced. In preparing the phosphor material, finely-divided zinc sulfide and copper-containing compound and chloride are admixed. This admixture and a specified amount of free sulphur are inserted into a firing furnace. In Fig. 1 is shown the firing furnace 10 having inserted therein an inert-atmosphere-containing outer sleeve 12, which encloses a firing tube 14. This firing tube 14 is preferably formed of closely-fitting and telescoping silica tubes wherein the phosphor-raw-mix-containing inner tube 16 is overlapped by the end-closing outer tube 18. The overlapping portions of these tubes 16 and 18 fit sufficiently close that the raw-mix constituents within the firing container 14 will be closed to convection of any inert gases within the outer tube 12 during the firing, but any positive gas pressures which are generated by the phosphor raw-mix constituents during firing will be allowed to escape between the inner tube 16 and outer tube 18. These positive-pressure gases will then find their way through the exit aperture 20 in the stopper 22 in the end of the outer tube 12 and thus into the atmosphere. Other more elaborate designs for the firing container or tube 14 would be suitable, provided the firing container is closed to convection of exterior gases, but sufficiently open to allow positive-gas pressures generated within the container 14 to escape.

The phosphor raw-mix is prepared by admixing zinc sulfide and copper-containing compound and chlorine in compound form. The amount of chlorine in compound form in the phosphor raw-mix admixture is expressible by the formula, $$w = (x + 0.076xf + 0.004f) \cdot (0.97 + 0.003 \cdot \text{grams ZnS})$$

In this formula, "$w$" represents the percent by weight of zinc sulfide of chlorine in compound form in the raw-mix admixture and "$f$" represents the frequency in kilocycles per second at which the phosphor is to be operated. The variable "$x$" is a numerical value which may vary between 0.08 and 0.3 with the optimum being about 0.13. This formula represents the percentage of chlorine required in the phosphor raw-mix admixture where the preferred double-fire procedure is to be utilized, as explained hereinafter. A single-fire procedure may be used, as explained hereinafter, if some output is to be sacrificed for simplicity in manufacturing procedure and in such a single-fire procedure the required percentage by weight of chlorine in the raw-mix is only 70% of that required for the double-fire procedure. Thus, the amount of chlorine required where a single-fire procedure is to be utilized is expressible by the formula $$w = 0.7 \cdot (x + 0.076xf + 0.004f) \cdot (0.97 + 0.003 \cdot \text{grams ZnS})$$

wherein "$w$," "$x$" and "$f$" are as indicated hereinbefore.

The amount of copper in the phosphor raw-mix admixture is partially dependent upon the percent by weight of chlorine in compound form and the percent by weight of copper in the phosphor raw-mix admixture is expressible by the formula, $$y = z + 0.005f + 0.83 \cdot (x + 0.076xf + 0.004f)$$

wherein "$y$" equals the percent by weight of ZnS of copper in compound form in the phosphor raw-mix admixture, "$z$" is a numerical value which may vary from 0.1 to 0.5 with the optimum being about 0.3 and "$x$" and "$f$" are as indicated hereinbefore. As indicated by this formula, the amount of copper required is independent of whether a single-fire or a double-fire procedure is used. It is dependent to some extent, however, on the amount of chlorine which may be used, although the percent by weight of copper which may be used is independent of the size of the phosphor batch which is being prepared.

As noted in the formula, for the required percent by weight of chlorine, a larger batch size requires a greater percentage of chlorine, apparently because the larger batch of phosphor being processed will not assimilate chlorine from the atmosphere of the firing container as readily. For this reason, a higher percentage or concentration of chlorine in the atmosphere is required where a larger batch is being processed in order that the proper amount of chlorine may be assimilated into the phosphor.

As in the aforementioned copending Lehmann patent application, the phosphor firing is conducted in an atmosphere comprising sulphur vapor and the increased performance of the phosphor is primarily attributable to this firing atmosphere comprising sulphur vapor. In order to obtain such an atmosphere, the sulphur may be either separately included within the firing container 14 or admixed with the phosphor raw-mix constituents and under the firing conditions disclosed herein, the latter procedure has been found to be preferable. A relatively small amount of sulphur is required and it has been found that sulphur in an amount of about 1% by weight of the phosphor raw-mix constituents will provide sufficient sulphur vapor in the atmosphere within the firing container, in order to realize the improved results. Greater than about 1% by weight of free sulphur may be utilized, if desired, and excessive amounts of free sulphur will not be harmful as these will merely be volatilized out of the firing tube. As a matter of practice, it has been found that about 5% of the weight of the phosphor raw-mix constituents of free sulphur is very satisfactory.

As a specific example, the copper-containing compound may comprise copper acetate, copper nitrate, copper chloride, copper sulfate, or mixtures thereof, for example. It should be noted that copper acetate is preferred. The chloride may comprise copper chloride, zinc chloride, ammonium chloride, or even HCl added in solution or mixtures of these chlorides, for example, and it is preferable that the chloride and the copper-containing compound on firing will leave no appreciable amounts of metallic constituents other than the metallic constituents of the final phosphor, namely zinc and copper. Of course, small amounts of additional chlorides can be tolerated such as small amounts of additional sodium, potassium or calcium chlorides. Following are specific examples for the raw-mix constituents for the double-firing procedure described hereinafter. For a single-firing procedure, the chlorine content in the raw-mix should be reduced by 30%.

*Example I*

[For 60 cycle operation of phosphor]

| Phosphor Constituent | Preferred Amount, grams | Permissible Amounts, grams |
| --- | --- | --- |
| ZnS | 10 | 10 |
| $CuCl_2 \cdot 2H_2O$ | 0.03 | 0.02 to 0.07 |
| $Cu(C_2H_3O_2)_2 \cdot H_2O$ | 0.09 | 0.03 to 0.15 |

*Example II*

[For 10 kcs. operation of phosphor]

| Phosphor Constituent | Preferred Amount, grams | Permissible Amounts, grams |
| --- | --- | --- |
| ZnS | 10 | 10 |
| $CuCl_2 \cdot 2H_2O$ | 0.065 | 0.045 to 0.13 |
| $Cu(C_2H_3O_2)_2 \cdot H_2O$ | 0.1 | 0.04 to 0.17 |

Notes:
Other chlorides may be substituted for the copper chloride, as noted hereinbefore, but chlorides of the well-known "killers" such as iron, cobalt, nickel, and chromium should be avoided. The required amounts of these other compounds may be calculated from the foregoing formulae. For example, zinc chloride or ammonium chloride or an equal amount of these compounds can be used. Also, a wet-mixing technique is preferred in all examples.

Other copper-containing compounds may be substituted for the copper chloride and copper acetate, such as copper nitrate or an equal amount of copper nitrate and copper acetate. The required amounts of these other compounds may be calculated from the foregoing formulae.

The foregoing specific examples are admixed with 5% by weight of free sulphur, for example.

As a specific example, the foregoing embodiments of Examples I and II may be placed in a firing container or tube 14 having a volume of 13.6 cc., varying the amount of chlorine according to whether a single-firing or double-firing procedure is to be utilized. Before commencing the firing step, the firing container or tube 14 is enclosed in an inert atmosphere such as nitrogen or a noble gas. The inert-gas container, which in Fig. 1 is shown as the outer tube 12, need be only slightly larger than the firing container 14, as shown in Fig. 1. Before commencing to fire the raw-mix admixture, the outer firing tube 12 is flushed with nitrogen. The raw-mix admixture is then fired at a temperature of from 850° C. to 1000° C. for at least one hour. The length of firing time over the minimum time of one hour has not been found to be particularly critical, but for best results, the firing conditions have been found to be about 950° C. for about one and one-half hours. During the firing, the inert-gas flush is continued slowly through flush aperture 24 to insure that the firing container is surrounded or enclosed by the inert-gas atmosphere. After the phosphor has been fired for the prescribed time, the fired admixture in the firing tube 14 is cooled in the inert-gas container 12.

The phosphor material when prepared as specified hereinbefore will have excellent performance characteristics. As noted, however, it is normally desirable to employ a double-firing procedure wherein the phosphor material is first fired, as specified hereinbefore, and is removed from the firing container when cooled. This first-fired phosphor is then very lightly crushed as by means of a mortar and pestle, for example, and is again placed in the firing container 14 with an additional amount of at least about 1% by weight of the crushed admixture of free sulphur. As in the first firing step, greater than about 1% by weight of free sulphur may be utilized, if desired, and excessive amounts of free sulphur will not be harmful as these will merely be volatilized of the firing tube. As a matter of practice, it has been found that about 5% by weight of the phosphor raw-mix constituents of free sulphur is very satisfactory. This additional free sulphur may be included in the firing tube 14 separately from the raw-mix constituents, although it is preferably admixed therewith. The firing tube 14 is then enclosed within an outer tube 12 which is flushed with an inert gas such as nitrogen, as in the first firing step, and the admixture is refired at a temperature of from 850° C. to 1000° C. for at least one hour, with the best firing temperature being about 950° C. for about one and one-half hours, as in the first firing. The length of the second firing time over the minimum specified time has not been found to be particularly critical. After this second firing and as in the first firing, the fired admixture is cooled in the firing tube 14, which is retained in the inert-gas container 12 during cooling.

Whether a single or a double-firing procedure is utilized, it is desirable after final firing to wash the fired material in a solution which is a solvent for cuprous sulfide, but which is not a solvent for zinc sulfide, such as a two-normal solution of potassium or sodium cyanide. In such a washing procedure, the fired and cooled phosphor material is removed from the firing tube 14 and carefully crushed to a powder and screened to remove large particles. The washed material is then separated from the washing solution and dried. The concentration of the washing solution is not critical.

The preferred procedure for washing the cooled phosphor with a solution which is a solvent for cuprous sulfide, but which is not a solvent for zinc sulfide, requires lightly crushing the fired or refired admixture and screening same through an 8 to 20 mesh screen. This screened-phosphor admixture is then boiled in the solution which is a solvent for cuprous sulfide, but which is not a solvent for zinc sulfide for from 10 to 20 minutes. The phosphor and solvent is then cooled for at least one hour and thereafter the solvent solution is decanted from the phosphor. The remaining phosphor is then gently crushed while still wet so as to break up substantially all agglomerates. This gentle crushing may be effected in a high-speed rotary homogenizer, such as a "Waring Blendor," for example. Thereafter the crushed powder is washed in water to remove any residual solvent solution. The water is then decanted and thereafter the phosphor preferably is washed in a solution which is a solvent for zinc oxide but which is not a solvent for zinc sulfide, such as a one-normal solution of acetic acid at a temperature of 90° C., for example. The concentration of this second solvent wash is not critical. The resulting doubly-washed phosphor material is separated from the acetic-acid wash by decanting and is again washed with water and is thereafter dried at a temperature not exceeding about 140°, and preferably not exceeding about 120° C. The dried phosphor is then screened (100 to 325 mesh, for example) to remove coarse particles.

Figure 2:
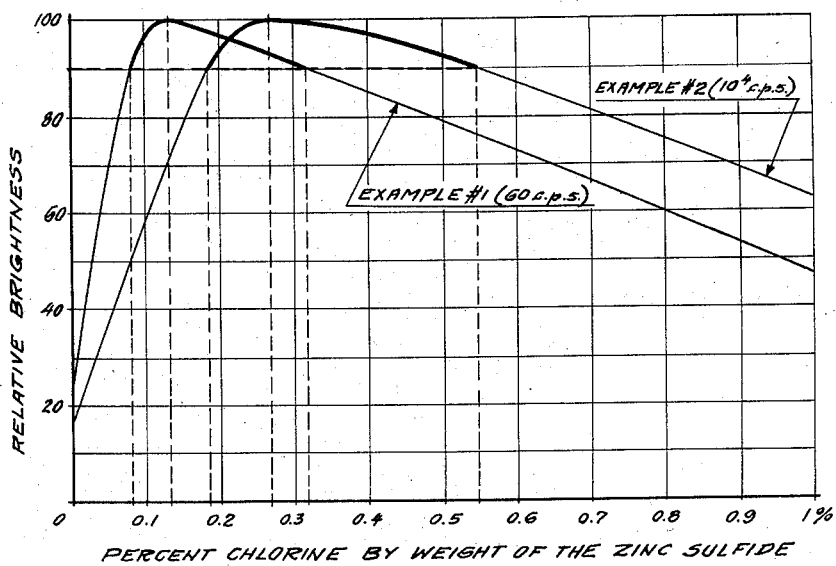
Fig. 2 is a graph of relative brightness vs. chlorine in the phosphor raw mix, illustrating the effect on relative brightness with varying proportions of the phosphor raw-mix constituents.

In Fig. 2 are shown performance curves of the specific phosphors as given under Examples I and II prepared by the preferred double-firing procedure. In these curves, brightness in relative units, is plotted vs. percent chlorine, expressed as a percent by weight of the zinc sulfide in the phosphor raw-mix. Each of these curves has been normalized to 100% as is customary. Of course, the measured output or brightness at $10^4$ kcs. excitation is normally greater than at 60 C. P. S. excitation. As shown in Fig. 2, chlorine added in the raw-mix in the optimum and permissible prescribed percentages (shown in heavy lines) will give excellent performance and percentages of chlorine below the specified minimum will result in greatly-decreased performance. With percentages of chlorine greater than the specified maximum, the phosphor performance also decreases, although not as rapidly as with decreasing percentages of chlorine. The amount of the chlorine-containing constituent in the admixture is very important and the percentage of copper in the admixture varies with the chlorine content, as per the foregoing formulae.

The foregoing normally green-emitting zinc-sulfide phosphor will have a better response or brightness at higher field strengths than at lower field strengths, as is customary with electroluminescent phosphors. If it is desired to increase the low-field response for this phosphor; that is, decrease the threshold of visible luminescence for the phosphor, the fired and lightly-crushed phosphor material, prior to any cyanide wash, may be placed in a thin layer, such as one-half inch, and heated at a temperature of from 200° C. to 250° C. for at least one hour and preferably for from one to two hours. This will normally decrease the threshold of visible luminescence and simultaneously impair somewhat the brightness at very high field-strength excitation. It is often desirable, however, to operate electroluminescent phosphors with relatively low excitation-field strengths and under these conditions of operation, the foregoing treatment will normally increase the brightness of the phosphor at these low fields. After the supplemental treatment, the phosphor may be washed in NaCN, for example, as hereinbefore described.

It should be understood that for best possible performance of the phosphor, the constituents comprising the phosphor raw-mix admixture should be as pure as possible. Slight impurity concentrations will invariably be present, but these should be minimized as much as possible, particularly iron, nickel, cobalt and chromium in any form. However, small amounts of zinc oxide up to about 0.75% may be tolerated, particularly if an organic copper salt is used as a source of copper in the raw mix.

It will be recognized that the objects of the invention have been achieved by providing a method for synthesizing a normally green-emitting electroluminescent zinc-sulfide phosphor which has been prepared by firing in an atmosphere comprising sulphur vapor, wherein a maximum of brightness and efficiency for the phosphor may always be obtained. In addition, there have been provided permissable and optimum conditions for synthesizing the phosphor in order to obtain a maximum of reproducibility with respect to brightness and efficiency. There has also been provided a supplemental washing treatment for the prepared phosphor for further enhancing its brightness and efficiency as well as a supplemental treatment by which the threshold of visible luminescence for the improved phosphor has been lowered.

While in accordance with the patent statutes, one best-known embodiment of the invention has been illustrated and described in detail, it is to be particularly understood that the invention is not limited thereto or thereby.

I claim:

1. The method of preparing an electroluminescent zinc-sulfide phosphor activated by copper and coactivated by chlorine: comprising admixing finely-divided zinc sulfide and copper-containing compound and chloride, the chloride principally comprising those chlorides which on firing will leave no metallic constituents other than those of the phosphor and specifically excluding the group consisting of iron chloride, cobalt chloride, nickel chloride and chromium chloride; inserting said admixture into a firing container which is closed to convection of exterior gases but which will still allow the escape of any positive gas pressures generated therein during firing; including in said firing container with said admixture at least about 1% by weight of said admixture of free sulphur; enclosing said firing container in an inert atmosphere; the amount of chlorine in compound form in said admixture expressed by the formula, $$w = 0.7 \cdot (x + 0.076xf + 0.004f) \cdot (0.97 + 0.003 \cdot \text{gms. ZnS})$$

the amount of copper in compound form in said admixture expressed by the formula, $$y = z + 0.005f + 0.83 \cdot (x + 0.076xf + 0.004f)$$

wherein $w$ is the percent by weight of zinc sulfide of chlorine in compound form in said admixture, $x$ is from 0.08 to 0.3 $y$ is the percent by weight of zinc sulfide of copper in compound form in said admixture, $z$ is from 0.1 to 0.5 and $f$ is the frequency in kilocycles per second at which said phosphor is to be operated; firing said admixture and included sulphur in said firing container at from 850° C. to 1000° C. for at least one hour; and cooling said fired admixture in said inert-atmosphere-enclosed firing container.

2. The method of preparing an electroluminescent zinc-sulfide phosphor activated by copper and coactivated by chlorine: comprising admixing finely-divided zinc sulfide and copper-containing compound and chloride, the chloride principally comprising those chlorides which on firing will leave no metallic constituents other than those of the phosphor and specifically excluding the group consisting of iron chloride, cobalt chloride, nickel chloride and chromium chloride; inserting said admixture into a firing container which is closed to convection of exterior gases but which will still allow the escape of any positive gas pressures generated therein during firing; including in said firing container with said admixture at least about 1% by weight of said admixture of free sulphur; enclosing said firing container in an inert atmosphere; the amount of chlorine in compound form in said admixture expressed by the formula, $$w = (x + 0.076xf + 0.004f) \cdot (0.97 + 0.003 \cdot gms. \, ZnS)$$

the amount of copper in compound form in said admixture expressed by the formula, $$y = z + 0.005f + 0.83 \cdot (x + 0.076xf + 0.004f)$$

wherein $w$ is the percent by weight of zinc sulfide of chlorine in compound form in said admixture, $x$ is from 0.08 to 0.3, $y$ is the percent by weight of zinc sulfide of copper in compound form in said admixture, $z$ is from 0.1 to 0.5 and $f$ is the frequency in kilocycles per second at which said phosphor is to be operated; firing said admixture and included sulphur in said firing container at from 850° C. to 1000° C. for at least one hour; cooling said fired admixture in said inert-atmosphere-enclosed firing container; removing said first fired admixture from said firing container; lightly crushing said first-fired admixture; re-inserting said crushed admixture and at least about 1% by weight of said crushed admixture of additional free sulphur into said firing container and re-enclosing same in an inert atmosphere; refiring said crushed admixture and said additional sulphur in said firing container at from 850° C. to 1000° C. for at least one hour; and cooling said refired admixture in said inert-atmosphere-enclosed firing container.

3. The method of preparing an electroluminescent zinc-sulfide phosphor activated by copper and coactivated by chlorine: comprising admixing finely-divided zinc sulfide and copper-containing compound and chloride, the chloride principally comprising these chlorides which on firing will leave no metallic constituents other than those of the phosphor and specifically excluding the group consisting of iron chloride, cobalt chloride, nickel chloride and chromium chloride; inserting said admixture into a firing container which is closed to convection of exterior gases but which will still allow the escape of any positive gas pressures generated therein during firing; including in said firing container with said admixture at least about 1% by weight of said admixture of free sulphur; enclosing said firing container in an inert atmosphere; the amount of chlorine in compound form in said admixture expressed by the formula, $$w = (x + 0.076xf + 0.004f) \cdot (0.97 + 0.003 \cdot gms. \, ZnS)$$

the amount of copper in compound form in said admixture expressed by the formula, $$y = z + 0.005f + 0.83(x + 0.76xf + 0.004f)$$

wherein $w$ is the percent by weight of zinc sulfide of chlorine in compound form in said admixture, $x$ is about 0.13, $y$ is the percent by weight of zinc sulfide of copper in compound form in said admixture, $z$ is about 0.3 and $f$ is the frequency in kilocycles per second at which said phosphor is to be operated; firing said admixture and included sulphur in said firing container at about 950° C. for about one and one-half hours; cooling said fired admixture in said inert-atmosphere-enclosed firing container; removing said first-fired admixture from said firing container; lightly crushing said first-fired admixture; re-inserting said crushed admixture and at least about 1% by weight of said crushed admixture of additional free sulphur into said firing container and re-enclosing same in an inert atmosphere; refiring said crushed admixture and said additional sulphur in said firing container at about 950° C. for about one and one-half hours; and cooling said refired admixture in said inert-atmosphere-enclosed firing container.

4. The method of preparing an electroluminescent zinc-sulfide phosphor activated by copper and coactivated by chlorine: comprising admixing finely-divided zinc sulfide and copper-containing compound and chloride, the chloride principally comprising those chlorides which on firing will leave no metallic constituents other than those of the phosphor and specifically excluding the group consisting of iron chloride, cobalt chloride, nickel chloride and chromium chloride; inserting said admixture into a firing container which is closed to convection of exterior gases but which will still allow the escape of any positive gas pressures generated therein during firing; including in said firing container with said admixture at least about 1% by weight of said admixture of free sulphur; enclosing said firing container in an inert atmosphere; the amount of chlorine in compound form in said admixture expressed by the formula, $$w = (x + 0.076xf + 0.004f) \cdot (0.97 + 0.003 \cdot gms. \, ZnS)$$

the amount of copper in compound form in said admixture expressed by the formula, $$y = z + 0.005f + 0.83 \cdot (x + 0.076xf + 0.004f)$$

wherein $w$ is the percent by weight of zinc sulfide of chlorine in compound form in said admixture, $x$ is from 0.08 to 0.3, $y$ is the percent by weight of zinc sulfide of copper in compound form in said admixture, $z$ is from 0.1 to 0.5 and $f$ is the frequency in kilocycles per second at which said phosphor is to be operated; firing said admixture and included sulphur in said firing container at from 850° C. to 1000° C. for at least one hour; cooling said fired admixture in said inert-atmosphere-enclosed firing container; removing said first-fired admixture from said firing container; lightly crushing said first-fired admixture; re-inserting said crushed admixture and at least about 1% by weight of said crushed admixture of additional free sulphur into said firing container and re-enclosing same in an inert atmosphere; refiring said crushed admixture and said additional sulphur in said firing container at from 850° C. to 1000° C. for at least one hour; cooling said refired admixture in said inert-atmosphere-enclosed firing container; removing said refired admixture from said firing container and lightly crushing and screening same; and washing said screened admixture in a solution which is a solvent for cuprous sulfide but which is not a solvent for zinc sulfide.

5. The method of preparing an electroluminescent zinc-sulfide phosphor activated by copper and coactivated by chlorine: comprising admixing finely-divided zinc sulfide and copper-containing compound and chloride, the chloride principally comprising those chlorides which on firing will leave no metallic constituents other than those of the phosphor and specifically excluding the group consisting of iron chloride, cobalt chloride, nickel chloride and chromium chloride; inserting said admixture into a firing container which is closed to convection of exterior gases but which will still allow the escape of any positive gas pressures generated therein during firing; including in said firing container with said admixture at least about 1% by weight of said admixture of free sulphur; enclosing said firing container in an inert atmosphere; the amount of chlorine in compound form in said admixture expressed by the formula, $$w = (x + 0.076xf + 0.004f) \cdot (0.97 + 0.003 \cdot gms. \, ZnS)$$

the amount of copper in compound form in said admixture expressed by the formula, $$y = z + 0.005f + 0.83 \cdot (x + 0.076xf + 0.004f)$$

wherein $w$ is the percent by weight of zinc sulfide of chlorine in compound form in said admixture, $x$ is from 0.08 to 0.3, $y$ is the percent by weight of zinc sulfide of copper in compound form in said admixture, $z$ is from 0.1 to 0.5 and $f$ is the frequency in kilocycles per second at which said phosphor is to be operated; firing said admixture and included sulphur in said firing container at about 950° C. for about one and one-half hours; cooling said fired admixture in said inert-atmosphere-enclosed firing container; removing said first-fired admixture from said firing container; lightly crushing said first-fired admixture; re-inserting said crushed admixture and at least about 1% by weight of said crushed admixture of additional free sulphur into said firing container and re-enclosing same in an inert atmosphere; refiring said crushed admixture and said additional sulphur in said firing container at about 950° C. for about one and one-half hours; and cooling said refired admixture in said inert-atmosphere-enclosed firing container; lightly crushing and screening said refired admixture through an 8 to 20 mesh screen; boiling said screened admixture in a solution which is a solvent for cuprous sulfide but which is not a solvent for zinc sulfide for from 10 to 20 minutes; cooling said boiled admixture and said solvent solution for at least one hour; separating said solvent solution from said admixture; gently crushing said separated admixture while still wet; washing said crushed admixture with water; separating said water from said water-washed admixture; washing said water-separated admixture in a hot solution of acetic acid; separating said acetic-acid-washed admixture from said acetic-acid wash; water washing said acetic-acid-washed admixture and separating this water wash from said admixture; drying said multiple-washed admixture at a temperature not exceeding about 140° C.; and screening said dried admixture to remove coarse particles.

6. The method of preparing an electroluminescent zinc-sulfide phosphor activated by copper and coactivated by chlorine: comprising admixing finely-divided zinc sulfide and copper-containing compound and chloride, the chloride principally comprising those chlorides which on firing will leave no metallic constituents other than those of the phosphor and specifically excluding the group consisting of iron chloride, cobalt chloride, nickel chloride and chromium chloride; inserting said admixture into a firing container which is closed to convection of exterior gases but which will still allow the escape of any positive gas pressures generated therein during firing; including in said firing container with said admixture at least about 1% by weight of said admixture of free sulphur; enclosing said firing container in an inert atmosphere; the amount of chlorine in compound form in said admixture expressed by the formula, $$w = (x + 0.076xf + 0.004f) \cdot (0.97 + 0.003 \cdot \text{gms. ZnS})$$

the amount of copper in compound form in said admixture expressed by the formula, $$y = z + 0.005f + 0.83 \cdot (x + 0.076xf + 0.004f)$$

wherein $w$ is the percent by weight of zinc sulfide of chlorine in compound form in said admixture, $x$ is from 0.08 to 0.3, $y$ is the percent by weight of zinc sulfide of copper in compound form in said admixture, $z$ is from 0.1 to 0.5 and $f$ is the frequency in kilocycles per second at which said phosphor is to be operated; firing said admixture and included sulphur in said firing container at from 850° C. to 1000° C. for at least one hour; and cooling said fired admixture in said inert-atmosphere-enclosed firing container; removing said first-fired admixture from said firing container; lightly crushing said first-fired admixture; re-inserting said crushed admixture and at least about 1% by weight of said crushed admixture of additional free sulphur into said firing container and re-enclosing same in an inert atmosphere; refiring said crushed admixture and said additional sulphur in said firing container at from 850° C. to 1000° C. for at least one hour; cooling said refired admixture in said inert-atmosphere-enclosed firing container; removing said refired admixture from said firing container and lightly crushing and screening same; placing said screened admixture in a thin layer and heating same in air at a temperature of from 200° C. to 250° C. for at least one hour; and thereafter washing said admixture in a solution which is a solvent for cuprous sulfide but which is not a solvent for zinc sulfide.

7. The method of preparing an electroluminescent zinc-sulfide phosphor activated by copper and coactivated by chlorine: comprising admixing finely-divided zinc sulfide and copper-containing compound and chloride, the chloride principally comprising those chlorides which on firing will leave no metallic constituents other than those of the phosphor and specifically excluding the group consisting of iron chloride, cobalt chloride, nickel chloride and chromium chloride; inserting said admixture into a firing container which is closed to convection of exterior gases but which will still allow the escape of any positive gas pressures generated therein during firing; including in said firing container with said admixture at least about 1% by weight of said admixture of free sulphur; enclosing said firing container in an inert atmosphere; the amount of chlorine in compound form in said admixture expressed by the formula, $$w = (x + 0.076xf + 0.004f) \cdot (0.97 + 0.003 \cdot \text{gms. ZnS})$$

the amount of copper in compound form in said admixture expressed by the formula, $$y = z + 0.005f + 0.83 \cdot (x + 0.076xf + 0.004f)$$

wherein $w$ is the percent by weight of zinc sulfide of chlorine in compound form in said admixture, $x$ is from 0.08 to 0.3, $y$ is the percent by weight of zinc sulfide of copper in compound form in said admixture, $z$ is from 0.1 to 0.5 and $f$ is the frequency in kilocycles per second at which said phosphor is to be operated; firing said admixture and included sulphur in said firing container at about 950° C. for about one and one-half hours; cooling said fired admixture in said inert-atmosphere-enclosed firing container; removing said first-fired admixture from said firing container; lightly crushing said first-fired admixture; re-inserting said crushed admixture and at least about 1% by weight of said crushed admixture of additional free sulphur into said firing container and re-enclosing same in an inert atmosphere; refiring said crushed admixture and said additional sulphur in said firing container at about 950° C. for about one and one-half hours; cooling said refired admixture in said inert-atmosphere-enclosed firing container; removing said refired admixture from said firing container and lightly crushing and screening same; placing said screened admixture in a thin layer and heating same in air at a temperature of from 200° C. to 250° C. for from one to two hours; and thereafter washing said admixture in a solution which is a solvent for cuprous sulfide but which is not a solvent for zinc sulfide.

References Cited in the file of this patent

UNITED STATES PATENTS

| | | |
|---|---|---|
| 2,541,384 | Rothschild | Feb. 13, 1951 |
| 2,623,858 | Kroger | Dec. 30, 1952 |
| 2,743,237 | Froelich | Apr. 24, 1956 |

OTHER REFERENCES

Zalm-Philips Research Reports, vol. 9, No. 2, April 1954, pages 81–108.